United States Patent
Shimizu et al.

(10) Patent No.: US 8,150,573 B2
(45) Date of Patent: Apr. 3, 2012

(54) HYBRID CAR TRAVEL MODE SETTING DEVICE

(75) Inventors: Tomomi Shimizu, Aichi (JP); Yoshiyuki Mizuno, Aichi (JP); Kenji Tanaka, Aichi (JP); Mikihisa Araki, Aichi (JP); Hiroaki Iwashita, Aichi (JP); Jun Shionoya, Nagoya (JP); Masayuki Yurimoto, Toyota (JP); Keiji Yamamoto, Okazaki (JP)

(73) Assignees: Kabushiki Kaisha Tokai Rika Denki Seisakusho, Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 557 days.

(21) Appl. No.: 12/438,272

(22) PCT Filed: Jul. 11, 2007

(86) PCT No.: PCT/JP2007/063858
§ 371 (c)(1),
(2), (4) Date: Feb. 20, 2009

(87) PCT Pub. No.: WO2008/026391
PCT Pub. Date: Mar. 6, 2008

(65) Prior Publication Data
US 2010/0235026 A1    Sep. 16, 2010

(30) Foreign Application Priority Data
Aug. 31, 2006    (JP) .................................. 2006-236913

(51) Int. Cl.
*G05D 3/00* (2006.01)
(52) U.S. Cl. ........................................... 701/22
(58) Field of Classification Search .................... 701/22; 307/9.1, 10.1, 10.2; 340/5.1, 5.2, 5.21
See application file for complete search history.

(56) References Cited

U.S. PATENT DOCUMENTS

| 5,513,107 | A | 4/1996 | Gormley |
| 6,271,745 | B1 * | 8/2001 | Anzai et al. .................. 340/5.53 |
| 6,275,141 | B1 * | 8/2001 | Walter ........................ 340/5.64 |
| 6,810,309 | B2 * | 10/2004 | Sadler et al. ..................... 701/1 |
| 6,888,445 | B2 * | 5/2005 | Gotfried et al. ............ 340/425.5 |
| 7,138,904 | B1 * | 11/2006 | Dutu ............................ 340/5.72 |
| 7,279,806 | B2 * | 10/2007 | Hale et al. ..................... 307/10.4 |
| 7,375,440 | B2 * | 5/2008 | Suyama et al. .............. 307/10.2 |
| 7,757,803 | B2 * | 7/2010 | Fiske et al. .................... 180/271 |
| 7,898,385 | B2 * | 3/2011 | Kocher ........................ 340/5.52 |

FOREIGN PATENT DOCUMENTS

| EP | 0 879 743 A2 | 11/1998 |
| EP | 0 926 023 A2 | 6/1999 |
| EP | 1 394 006 A1 | 3/2004 |
| JP | 06-219187 | 8/1994 |
| JP | 11-051177 | 2/1999 |
| JP | 2001-238306 | 8/2001 |

(Continued)

*Primary Examiner* — Faye M. Fleming
(74) *Attorney, Agent, or Firm* — Patterson Thuente Christensen Pedersen, P.A.

(57) ABSTRACT

A travel mode setting device for a hybrid car capable of ensuring the security against car theft and convenience when the car is lent to the third party. The hybrid car has travel drive sources and selectively uses one of them and can travel in one of travel modes. Authenticating means separately authenticate the car user and creates authentication results. Limiting means limits the travel modes to the usable travel modes according to the results of the authentication by the authenticating means.

13 Claims, 4 Drawing Sheets

FOREIGN PATENT DOCUMENTS

| | | |
|---|---|---|
| JP | 2001-342760 | 12/2001 |
| JP | 2002-145020 | 5/2002 |
| JP | 2003-048513 | 2/2003 |
| JP | 2003-127831 | 5/2003 |
| JP | 2003176748 A * | 6/2003 |
| JP | 2004-027490 | 1/2004 |
| JP | 2004-197649 | 7/2004 |
| JP | 2004-243790 | 9/2004 |
| JP | 2005-036523 | 2/2005 |
| JP | 2005-247293 | 9/2005 |
| JP | 2006-112053 | 4/2006 |
| JP | 2006-117198 | 5/2006 |
| JP | 2006-131036 | 5/2006 |
| JP | 2006-174652 | 6/2006 |
| JP | 2006-224900 | 8/2006 |
| JP | 2007-246070 | 9/2007 |
| WO | WO 01/25572 A1 | 4/2001 |
| WO | WO 2006/046360 A1 | 5/2006 |

* cited by examiner

HYBRID CAR TRAVEL MODE SETTING DEVICE

PRIORITY CLAIM

The present application is a National Phase entry of PCT Application No. PCT/JP2007/063858, filed Jul. 11, 2007, which claims priority from Japanese Application Number 2006-236913, filed Aug. 31, 2006, the disclosures of which are hereby incorporated by reference herein in their entirety.

FIELD OF THE INVENTION

The present invention relates to a travel mode setting device for a hybrid vehicle that can use a plurality of travel drive sources to travel.

BACKGROUND OF THE INVENTION

In the prior art, various technologies have been developed for a vehicle to prevent unauthorized locking and unlocking of the doors or unauthorized starting of the engine. As one example of such an unauthorized operation prevention technology, patent document 1 describes the implementation of biometric authentication to authenticate an individual and permit the locking or unlocking of vehicle doors or permit the starting of the engine. In this technology, a camera or the like is used to acquire biometric information of a user, the biometric information is transmitted to a server with a mobile information terminal such as a mobile phone, and the server performs a highly accurate authentication process. When the biometric information is authenticated, the locking or unlocking of vehicle doors or the starting of the engine is permitted. When the biometric information is not authenticated, such operations are prohibited.

With the technology of patent document 1, when lending the vehicle to another person, the vehicle owner must use the mobile information terminal to communicate with the server and permit the locking and unlocking of the doors and the starting of the engine. This ensures security against crimes, such as vehicle thefts, since the vehicle owner must communicate with the server by himself or herself. However, when lending the vehicle to another person, the vehicle owner must use the portable information terminal to perform authentication whenever necessary. This is inconvenient when lending the vehicle to another person.

Patent Document 1: Japanese Laid-Open Patent Publication No. 2005-36523

SUMMARY OF THE INVENTION

The present invention provides a travel mode setting device for a hybrid vehicle that ensures security against vehicle thefts while ensuring convenience when lending the vehicle to a third person.

One aspect of the present invention is a travel mode setting device for a hybrid vehicle. The hybrid vehicle is provided with a plurality of travel drive sources and allowed to travel in one of a plurality of travel modes by selectively using the plurality of travel drive sources. The travel mode setting device according to the present invention includes a plurality of authentication means each for authenticating a vehicle user and generating an authentication result and a specification means for specifying a usable travel mode from the plurality of travel modes in accordance with the authentication results of the plurality of authentication means.

A second aspect of the present invention is a travel mode setting device for a hybrid vehicle. The hybrid vehicle is provided with a plurality of travel drive sources and allowed to travel in one of a plurality of travel modes by selectively using the plurality of travel drive sources. The travel mode setting device according to the present invention includes a plurality of authentication means each for authenticating a vehicle user and generating an authentication result, a management means for managing a plurality of travel schedules related to the plurality of travel modes, and a specification means for specifying traveling of the hybrid vehicle by selectively setting the plurality of travel schedules in accordance with the authentication results of the plurality of authentication means.

DETAILED DESCRIPTION OF THE PREFERRED EMBODIMENTS

First Embodiment

A travel mode setting device for a hybrid vehicle according to a first embodiment of the present invention will now be discussed with reference to FIGS. 1 to 4.

Figure 1:
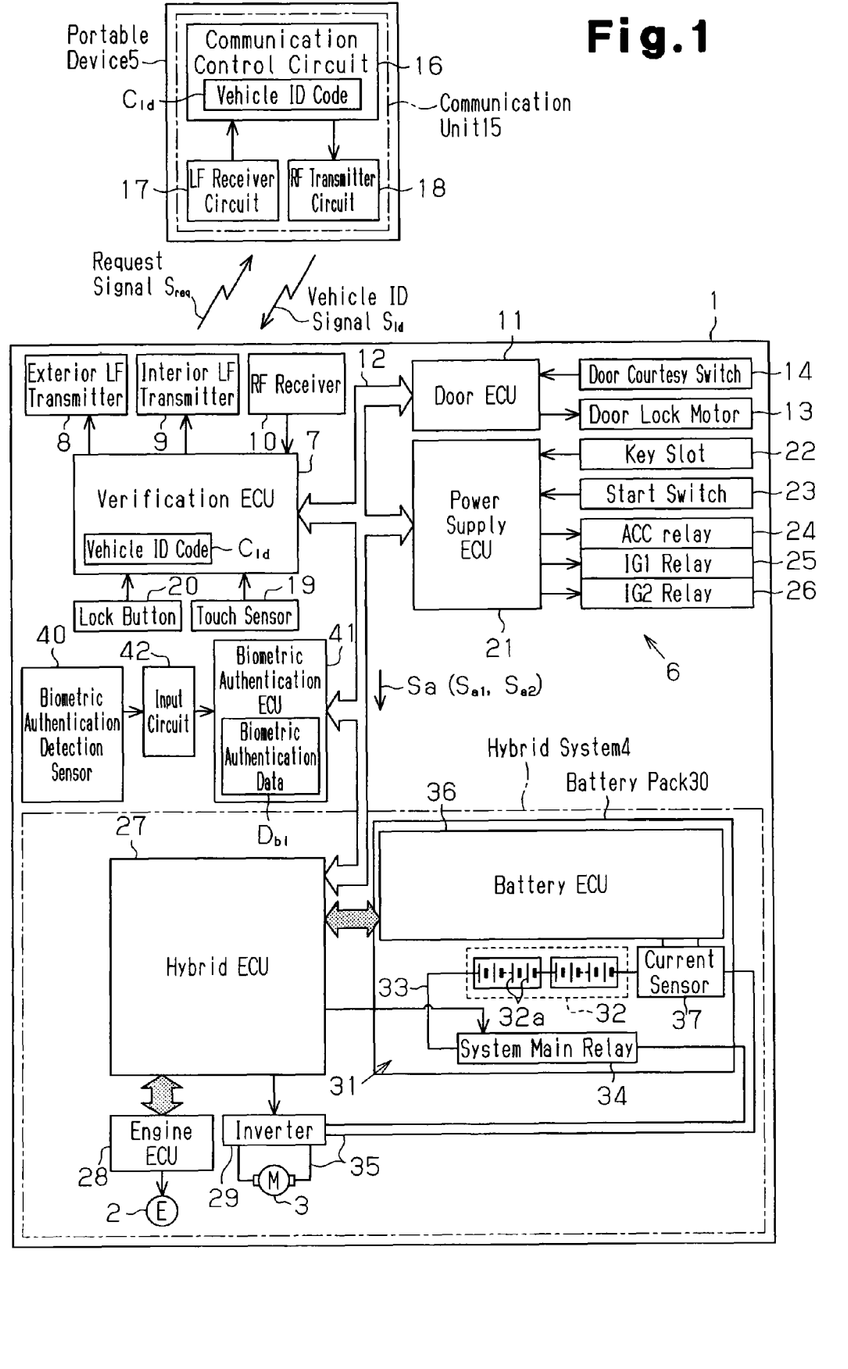
FIG. 1 is a schematic block diagram showing the structure of a hybrid vehicle according to a first embodiment of the present invention.

Referring to FIG. 1, when a vehicle is a hybrid vehicle 1, a hybrid system 4, which uses both an engine 2 and a motor 3 as a drive source to drive the vehicle wheels, is installed in the body of the vehicle. The hybrid system 4 controls various modes, such as an engine travel mode (EG mode) in which the vehicle is driven by the power of the engine mechanically transmitted to the wheels, a first hybrid travel mode (first HV mode) in which the vehicle is driven by a motor that generates electric power with the power of the engine, a second hybrid travel mode (second HV mode) in which the wheels are directly driven by both the engine and the motor, and a motor travel mode (EV mode) in which the engine is stopped and the vehicle is driven by only the motor. The first HV mode and the second HV mode each correspond to a hybrid travel mode, and the EV mode corresponds to an electric drive source travel mode. Further, the engine 2 and the motor 3 each form a travel drive source.

A hands-free system 6 is installed in the hybrid vehicle 1 to allow the doors to be locked or unlocked or allow the hybrid system to be activated without a mechanical key as long as the driver is carrying a portable device 5. The hybrid vehicle 1 includes a verification ECU 7, which performs ID verification in the hands-free system 6. An exterior LF transmitter 8, which is located outside the vehicle, an interior LF transmitter 9, which is located inside the vehicle, and an RF receiver 10, which is also located inside the vehicle, are connected to the verification ECU 7.

A door ECU 11, which controls the locking and unlocking of the doors, is connected to the verification ECU 7 by a bus 12 in the vehicle. A door lock motor 13, which functions as a drive source for locking and unlocking the doors, is connected to the door ECU 11. A door courtesy switch 14, which detects whether a door is open or closed, is connected to the door ECU 11. The door ECU 11 receives an open signal or a close signal from the door courtesy switch 14 to determine whether the door is currently open or closed.

The portable device 5 includes a communication unit 15, which sends a vehicle ID code Cid to the hybrid vehicle 1 through wireless communication. The communication unit 15 includes a communication control circuit 16, which centrally controls the communication unit 15. The communication control circuit 16 is formed by a device element, such as a CPU or a memory. The vehicle ID code Cid, which is unique to the portable device, is registered in the memory of the communication control circuit 16. The communication control circuit 16 is connected to an LF receiver circuit 17, which receives an LF band signal and provides the communication control circuit with the received signal, and an RF transmitter circuit 18, which transmits an RF band signal based on a command from the communication control circuit 16. The portable device 5, the verification ECU 7, and the transmitters 8 to 10 form an identification code verification means (one of a plurality of authentication means), and the vehicle ID code Cid corresponds to an identification code.

When the hybrid vehicle 1 is in a parked state (when the hybrid system is deactivated and the doors are locked), the verification ECU 7 forms a communication area outside the vehicle by using the exterior LF transmitter 8 to transmit an LF band request signal Sreq, which requests an ID in response. When a plurality of exterior LF transmitters 8 are used, the exterior LF transmitters 8 sequentially transmit the request signal Sreq in a repetitive manner. When the portable device 5 enters the exterior communication area, the portable device 5 receives the request signal Sreq with the LF receiver circuit 17. When recognizing that the received LF signal is requesting an ID in response, the portable device 5 transmits the vehicle ID code Cid, which is registered in its memory, as a vehicle ID signal Sid in the RF band from the RF transmitter circuit 18.

When the exterior LF transmitter 8 is transmitting the request signal Sreq, if the RF receiver 10 receives the vehicle ID signal Sid, the verification ECU 7 determines that exterior communication has been established. Then, the verification ECU 7 compares the vehicle ID code Cid of the portable device 5 with a code sequence registered in the vehicle to perform exterior verification. When determining that exterior verification has been established, the verification ECU 7 activates a touch sensor 19, which has been in a deactivated state. Subsequently, when the touch sensor 19 detects a door handle being touched by a person, the verification ECU 7 provides the door ECU 11 with a door unlock request signal. In response to the door unlock request signal, the door ECU 11 drives the door lock motor 13 to unlock the locked doors.

When detecting that a lock button 20 on a door handle has been pushed down in a state in which the engine of the hybrid vehicle 1 is stopped and the doors are unlocked, the verification ECU 7 again forms the exterior communication area, which is for performing exterior verification, with the exterior LF transmitters 8. When exterior verification is established, the verification ECU 7 provides the door ECU 11 with a door lock request signal. In response to the door lock request signal, the door ECU 11 drives the door lock motor 13 to lock the doors.

When the door courtesy switch 14 detects that a driver has entered the vehicle, the verification ECU 7 forms a communication area inside the vehicle (interior communication area) by transmitting a request signal Sreq from the interior LF transmitter 9. When the portable device 5 enters the interior communication area, the portable device 5 returns a vehicle ID signal Sid in response to the request signal Sreq. When the RF receiver 10 receives the vehicle ID signal Sid from the portable device 5 while the interior LF transmitter 9 is transmitting the request signal Sreq, the verification ECU 7 determines that interior communication has been established. The verification ECU 7 then performs interior verification by comparing the vehicle ID code Cid between the portable device 5, which is located in the vehicle, and the vehicle to determine the result of the interior verification. The interior verification may also include immobilizer verification performed by comparing the code of a transponder embedded in the portable device 5 with the code of the vehicle.

A power supply ECU 21, which controls power supplies for various electric devices installed in the vehicle, is connected to the verification ECU 7 by the bus 12. The power supply ECU 21 is activated when, for example, the portable device 5 is completely inserted into a key slot 22, which is arranged next to the steering wheel. A start switch 23, which is operated to activate or deactivate the hybrid system 4, is connected to the power supply ECU 21. In the hybrid vehicle 1, the hybrid system 4 is activated when the start switch 23 is turned on in a state in which the gearshift lever is located at a parking position and the brake pedal is depressed. Also, an ACC relay 24, which turns the power supplies of accessories on and off, and an IG1 relay 25 and an IG2 relay 26, which switch the ignition system on and off, are connected to the power supply ECU 21.

A hybrid ECU 27, which centrally controls the hybrid system 4, is connected to the verification ECU 7 by the bus 12. An engine ECU 28, which executes ignition control and fuel injection control on the engine 2, is connected to the hybrid ECU 27 through controller area network (CAN) communication. Further, the motor 3 is connected to the hybrid ECU 27 by an inverter 29. The hybrid ECU 27 controls and drives the engine 2 and the motor 3, through the inverter 29, by calculating an engine output and a motor torque that is in accordance with the driving state based on the accelerator degree, the gearshift position, and output signals from various sensors. The hybrid ECU 27 forms a specification means and a management means.

A battery pack 30, which is a unit formed by accommodating battery components in a single case, is installed in the hybrid vehicle 1. The battery pack 30 is arranged, for example, under a rear seat in the vehicle. The battery pack 30 contains a battery 31, which serves as a battery component. The battery 31 is used as a power supply for the motor 3, which is a travel drive source, and as a power supply for a starter motor (not shown), which generates rotation for starting the engine 2.

The battery 31 includes a battery module 32, which includes a plurality of series-connected cells 32*a*, and a system main relay 34, which is connected in series to a high-voltage power supply circuit 33 of the battery module 32. The motor 3 and the inverter 29 are connected to each other by a power cable 35, which is capable of supplying a large current with a high voltage. In the same manner, the inverter 29 and the battery 31 are connected to each other by another power cable 35, which is capable of supplying a large current with a high voltage. The system main relay 34 is connected to the hybrid ECU 27. The system main relay 34 connects or disconnects the high-voltage power supply circuit 33 in response to a command from the hybrid ECU 27.

The battery pack 30 includes a battery ECU 36, which monitors the state of charge of the battery 31. The battery ECU 36 is connected to the hybrid ECU 27 through CAN communication. A current sensor 37, which detects the amount of current flowing through the high-voltage power supply circuit 33, is connected to the wiring of the high-voltage power supply circuit 33. The current sensor 37 is connected to the battery ECU 36 and provides a detection signal that is in accordance with the value of the current flowing through the high-voltage power supply circuit 33 to the battery ECU 36. The battery ECU 36 monitors the state of charge or charged level of the battery 31 based on the detection signal from the current sensor 37 and provides the charge monitoring result to the hybrid ECU 27 in response to a state of charge notification request from the hybrid ECU 27. The hybrid ECU 27 determines the state of charge of the battery 31 based on the charge monitoring result sent from the battery ECU 36.

Figure 2:
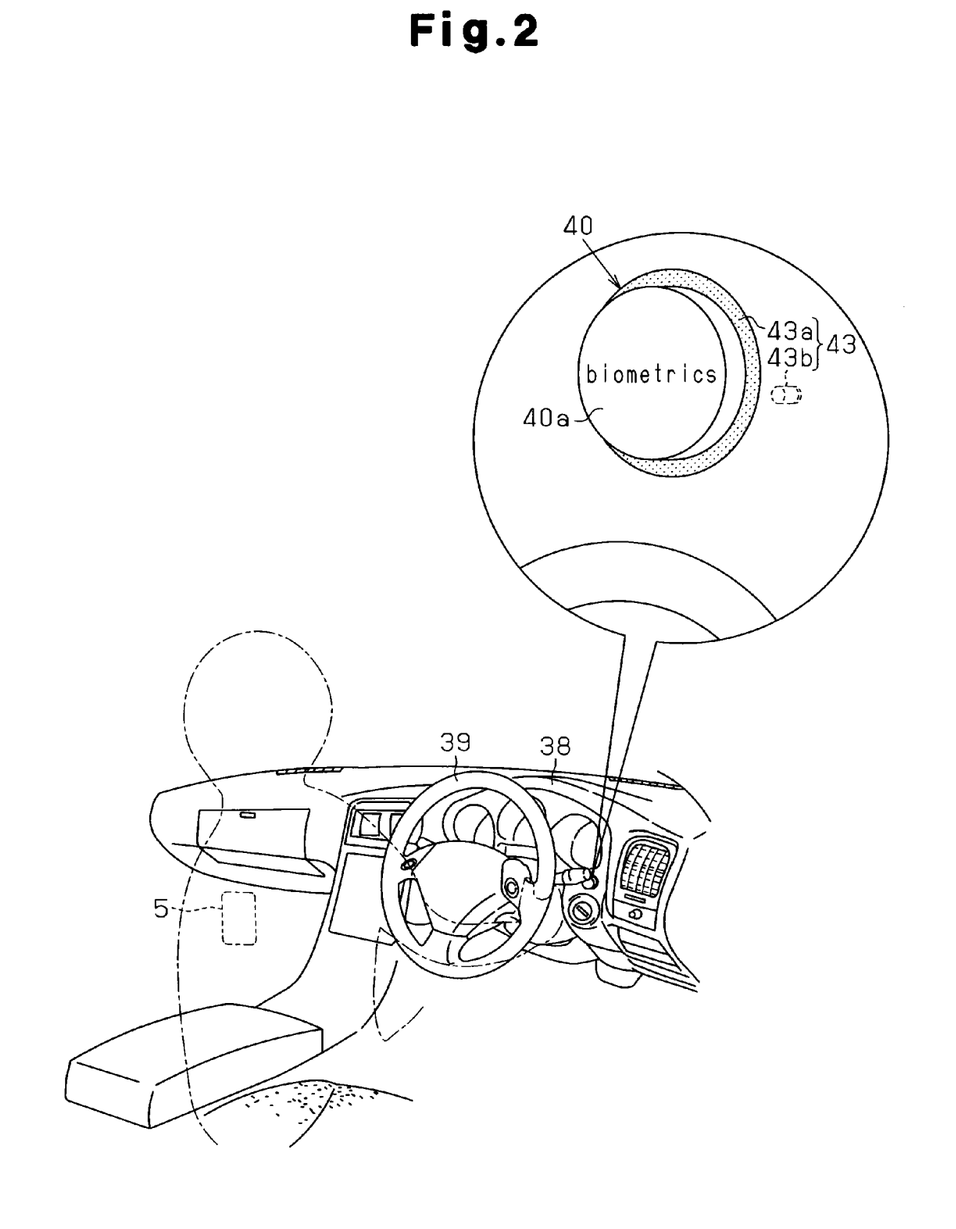
FIG. 2 is a perspective view showing the appearance of a driver seat and a biometric authentication sensor arranged near the driver seat.

As shown in FIG. 2, an instrument panel 38 of the vehicle includes a biometric authentication detection sensor 40, which is arranged near the steering wheel 39. In the first embodiment, the biometric authentication detection sensor 40, which is a fingerprint sensor for detecting the fingerprint of, for example, a testee, is activated when determining that the driver has entered the vehicle based on the detection signal of the door courtesy switch 14. The sensor 40 is capable of generating fingerprint data, which serves as biometric authentication data Dbi, from the fingerprint of a testee who touches a detection surface 40a of the sensor 40. The biometric authentication data Dbi corresponds to biometric information.

As shown in FIG. 1, the hybrid vehicle 1 includes a biometric authentication ECU 41, which identifies an individual from a testee's physical information. The biometric authentication ECU 41 has an input connected to the biometric authentication detection sensor 40 via an input circuit 42 and an output connected to the bus 12. When physical information is detected with the detection surface 40a, the biometric authentication ECU 41 provides the biometric authentication data Dbi, which is in accordance with the detection result, to the biometric authentication ECU 41 via the input circuit 42. The biometric authentication detection sensor 40, the biometric authentication ECU 41, and the input circuit 42 form a biometric authentication means (one of a plurality of authentication means).

The biometric authentication ECU 41 includes a memory. The biometric authentication data Dbi is registered beforehand in the memory. When acquiring the biometric authentication data Dbi from the biometric authentication sensor 40, the biometric authentication ECU 41 compares the acquired data with the data registered in the memory and determines whether the two are the same to perform biometric authentication. The biometric authentication ECU 41 determines that biometric authentication has been established when the two data sequences are the same and determines that biometric authentication has not been established when the two data sequences are not the same.

As shown in FIG. 2, an indicator 43, which indicates whether or not biometric authentication is established, is arranged around the biometric authentication detection sensor 40. The indicator 43 includes an annular ornamental surface 43a, which is arranged on the instrument panel 38 and formed from, for example, a colored transparent material, and an LED 43b, which is located on a rear surface of the instrument panel 38 to illuminate the ornamental surface 43a from the rear. The LED 43b is connected to the biometric authentication ECU 41 by an electric wire. The biometric authentication ECU 41 controls the lighting of the LED 43b. When determining that biometric authentication has been established, the biometric authentication ECU 41 illuminates the indicator 43 to notify the driver that biometric authentication has been established.

In accordance with the results of the interior verification and biometric authentication, among the plurality of travel modes (EG mode, first HV mode, second HV mode, and EV mode), the hybrid ECU 27 specifies the types of travel modes that can be presently used. In the first embodiment, if only interior verification is established and biometric authentication is not, the vehicle is allowed to travel only in the EV mode, that is, only with the motor 3 without charging the battery 31. If the interior verification and biometric authentication are both established, the vehicle is allowed to travel in any one of the travel modes, that is, with both of the engine 2 and the motor 3.

The operation of the travel mode setting device for a hybrid vehicle in the first embodiment will now be discussed.

When the driver (occupant) enters the hybrid vehicle 1 in a parked state and opens a door, the door courtesy switch 14 detects the opening of the door. Based on the detection signal from the door courtesy switch 14, the door ECU 11 notifies the verification ECU 7 of the opening of the door. Afterwards, when determining that the driver has entered the vehicle, the verification ECU 7 starts the interior verification by transmitting the request signal Sreq from the interior LF transmitter 9.

In response to the request signal Sreq, the portable device 5 sends the vehicle ID signal Sid, which includes its vehicle ID code Cid, to the verification ECU 7. The verification ECU 7 receives the vehicle ID signal Sid through the RF receiver 10 and compares the vehicle ID code Cid of the portable device 5 with the vehicle ID code Cid of the hybrid vehicle 1 to perform interior verification. If interior verification is established, the verification ECU 7, for example, sets an interior verification establishment flag in its memory and recognizes the establishment of the interior verification.

Then, the driver inserts the portable device 5 into the key slot 22. When immobilizer verification is performed between the portable device 5 and the verification ECU 7, an antenna coil, which is arranged in the vehicle, transmits a drive radio wave when half of the portable device 5 becomes inserted into the key slot 22. The verification ECU 7 uses the drive radio wave to perform immobilizer verification with the portable device 5. The verification ECU 7 compares a transponder code of a tag in the portable device 5 with a transponder code registered in the verification ECU 7. When the two codes are the same, the verification ECU 7 determines that immobilizer verification has been established. From the half inserted state, when the portable device 5 becomes completely inserted into the key slot 22, the power supply ECU 21 is activated.

Subsequently, the driver touches the detection surface 40a of the biometric authentication detection sensor 40, which is located next to the steering wheel 39, with a finger. When acquiring fingerprint data from a fingerprint on the detection surface 40a, the biometric authentication detection sensor 40 transmits the fingerprint data as biometric authentication data Dbi to the biometric authentication ECU 41 through the input circuit 42. The biometric authentication ECU 41 compares the biometric authentication data Dbi transmitted from the sensor 40 with its data (registered data) to determine whether they are the same. When the two data sequences are the same, the biometric authentication ECU 41 determines that biometric authentication has been established. In this case, the biometric authentication ECU 41, for example, sets a biometric authentication establishment flag in its memory and recognizes the establishment of the biometric authentication. Further, the biometric authentication ECU 41 lights the LED 43*b* to illuminate the indicator 43 and notify the driver of the biometric authentication establishment.

Afterwards, to activate the hybrid system 4 (i.e., start the engine), the driver turns on (pushes) the start switch 23 while depressing the brake pedal with the gearshift lever in the parking position. When determining that the hybrid system 4 is being activated, the power supply ECU 21 refers to the verification ECU 7 to check the authentication result.

In response to an authentication check request from the power supply ECU 21, the verification ECU 7 refers to the biometric authentication ECU 41 to check the biometric authentication establishment result. In response to a biometric authentication establishment result check request from the verification ECU 7, the biometric authentication ECU 41 notifies the verification ECU 7 of the biometric authentication result. For example, the biometric authentication ECU 41 sends a biometric authentication establishment notification if the biometric authentication establishment flag is set in its memory. If the biometric authentication establishment flag is not set, the biometric authentication ECU 41 sends a biometric authentication non-establishment notification to the verification ECU 7.

The verification ECU 7 notifies the power supply ECU 21 of its interior verification establishment result and the biometric authentication result, which is received from the x ECU 41. In the first embodiment, the verification ECU 7 sends to the power supply ECU 21*a* first notification when interior verification and biometric authentication are both established, a second notification when only one of interior verification and biometric authentication is established, and a third notification when interior verification and biometric authentication are both not established.

When receiving the first notification or second notification from the verification ECU 7, the power supply ECU 21 determines that at least either one of interior verification and biometric authentication has been established and provides the hybrid ECU 27 with an activation signal Sa to activate the hybrid system 4. Further, when receiving the third notification from the verification ECU 7, the power supply ECU 21 determines that interior verification and biometric authentication have both not been established and does not provide the hybrid ECU 27 with the activation signal Sa.

More specifically, in the first embodiment, when receiving the first notification, the power supply ECU 21 provides the hybrid ECU 27 with an all-activation permission signal Sa1, which permits the vehicle to travel in any of the travel modes (EG mode, first HV mode, second HV mode, and EV mode). When receiving the second notification, the power supply ECU 21 provides the hybrid ECU 27 with a restricted permission signal Sa2, which permits the vehicle to travel only in the EV mode. The hybrid ECU 27 activates each one of the three relays 24 to 26 when receiving the all-activation permission signal Sa1 or the restriction permission signal Sa2.

When receiving the all-activation permission signal Sa1 from the power supply ECU 21, the hybrid ECU 27 controls the hybrid system 4 so that the hybrid vehicle 1 can travel in any one of the travel modes. When receiving the restricted permission signal Sa2 from the power supply ECU 21, the hybrid ECU 27 controls the hybrid system 4 so that the hybrid vehicle 1 travels in only the EV mode.

When the vehicle owner drives the hybrid vehicle 1, the true vehicle owner would be in procession of the portable device 5. In addition, biometric authentication would be established with the hybrid vehicle 1. Thus, for the true vehicle owner, interior verification and biometric authentication would both be established. Thus, the hybrid vehicle 1 would be able to travel in any one of the four travel modes, and the hybrid vehicle 1 can be driven freely without any restrictions.

Further, when the vehicle owner lends the hybrid vehicle 1 to another person, such as when using valet parking service, the vehicle owner would lend the portable device 5 to an attendant when leaving the vehicle. In such a case, when the attendant enters the vehicle, interior verification is performed between the hybrid vehicle 1 and the portable device 5. If the vehicle ID codes Cid of the two are the same, interior verification is established. Further, the attendant undergoes fingerprint authentication. However, even if the attendant touches the biometric authentication detection sensor 40, the fingerprint data would not match, and fingerprint authentication would not be established. That is, when the attendant enters the vehicle, interior verification would be established but biometric authentication would not be established.

Accordingly, when the driver is the attendant, if the start switch 23 is turned on to activate the hybrid system 4, the hybrid system 4 would be in a state in which the vehicle travels only in the EV mode.

The EV mode is a travel mode in which the vehicle travels using only the motor 3 as a travel drive source. Thus, when the battery 31 drains, the vehicle cannot further travel. Consequently, when handing the portable device 5 and lending the vehicle to a third person such as an attendant, the lent vehicle becomes a function restricted vehicle in which it can travel for only a certain distance (certain time). Thus, even if the hybrid vehicle 1 is stolen while being lent to someone, the vehicle will not be able to move after traveling for a certain distance. This increases the probability of the thief leaving the stolen vehicle somewhere. For this reason, the recovery possibility of the stolen vehicle is increased, and security against vehicle theft can be improved. Further, the vehicle can be lent to a third person just by handing over the portable device 5. Therefore, the vehicle owner does not have to perform any special tasks, and there would be no difficulty in lending the vehicle to a third person.

In the present invention, the plurality of authentication means for authenticating an individual is not necessarily limited to interior verification and biometric authentication. For example, an individual may be authenticated by having the verification ECU 7 perform two types of interior authentication. A case in which two types of interior authentication is performed will now be discussed with reference to FIG. 3.

Figure 3:
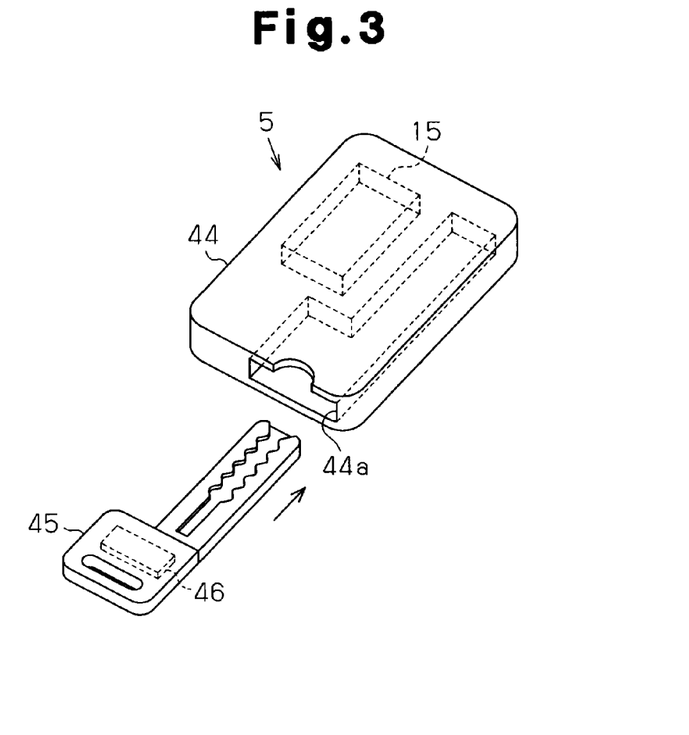
FIG. 3 is a perspective view showing a portable device that can retain an emergency key.

As shown in FIG. 3, the portable device 5 includes a portable device main body 44 having a retaining socket 44*a* in which an emergency key 45 is retained in a removable manner. In this case, a second communication unit 46 for wireless ID verification is embedded in the emergency key 45. The emergency key 45 is insertable into a key cylinder located near the driver seat and used when battery drainage occurs in the portable device 5. The portable device main body 44 may be a smart communication mechanism in which the vehicle ID code Cid is sent in the RF band in response to a request in the LF band in the same manner as the communication unit 15 embedded in the portable device main body 44. Alternatively, the portable device main body 44 may be used as a transponder activated in response to a drive radio wave from a coil antenna arranged in the vehicle to send its unique transponder code. In this case, the second communication unit 46 forms an identification code verification means (one of a plurality of authentication means).

When the second communication unit 46 is a smart communication mechanism, the verification ECU 7 performs interior verification with the communication unit 15 (first identification code verification means) and then with the second communication unit 46 (second identification code verification means). For example, if the communication unit 15 receives the request signal Sreq from the interior LF transmitter 9 before the second communication unit 46, the verification ECU 7 first compares the vehicle ID code Cid of the communication unit 15 with the vehicle ID code Cid registered in the vehicle to perform first interior verification. Then, the verification ECU 7 compares the vehicle ID code Cid of the second communication unit 46 with the vehicle ID code Cid registered in the vehicle to perform second interior verification.

When the hybrid system 4 is turned on to activate the start switch 23, if the first interior verification and second interior verification are both satisfied, the hybrid ECU 27 allows the hybrid vehicle 1 to travel in any one of the travel modes. If only one of the first interior verification and second interior verification is satisfied, among the four travel modes, the hybrid ECU 27 allows the hybrid vehicle 1 to travel only in the EV mode.

The emergency key 45 is a key that can lock and unlock the glove compartment in the vehicle or the trunk. When temporarily lending the hybrid vehicle 1 to a person, such as when using parking valet service, to prevent the emergency key 45 from being used without consent, the emergency key 45 is removed from the portable device main body 44. In this case, the vehicle owner keeps only the emergency key 45 and hands the portable device main body 44 to an attendant without the emergency key 45.

Accordingly, the attendant would enter the hybrid vehicle 1 carrying the portable device 5 without the emergency key 45. That is, when the attendant enters the vehicle, only the first interior verification is performed between the hybrid vehicle 1 and the portable device main body 44. In this case, therefore, among the first interior verification, which is performed between the portable device main body 44 and the vehicle, and the second interior verification, which is performed between the emergency key 45 and the vehicle, only the first interior verification is established. Thus, the hybrid vehicle 1 is allowed to travel in only the EV mode. In this manner, the type of travel mode for the hybrid vehicle 1 can also be restricted when lending the vehicle to a third person by arranging the second communication unit 46, which is for wireless ID verification, in the emergency key 45, which is retained in the portable device main body 44.

Furthermore, in the present invention, the authentication means for authenticating an individual may be a means for checking the retained state of the emergency key 45 in the portable device main body 44 (retainment check means). In this case, the plurality of authentication means may include a means for performing interior verification between the portable device 5 and the vehicle and the retain check means. The retainment check means will now be discussed with reference to FIG. 4.

Figure 4:
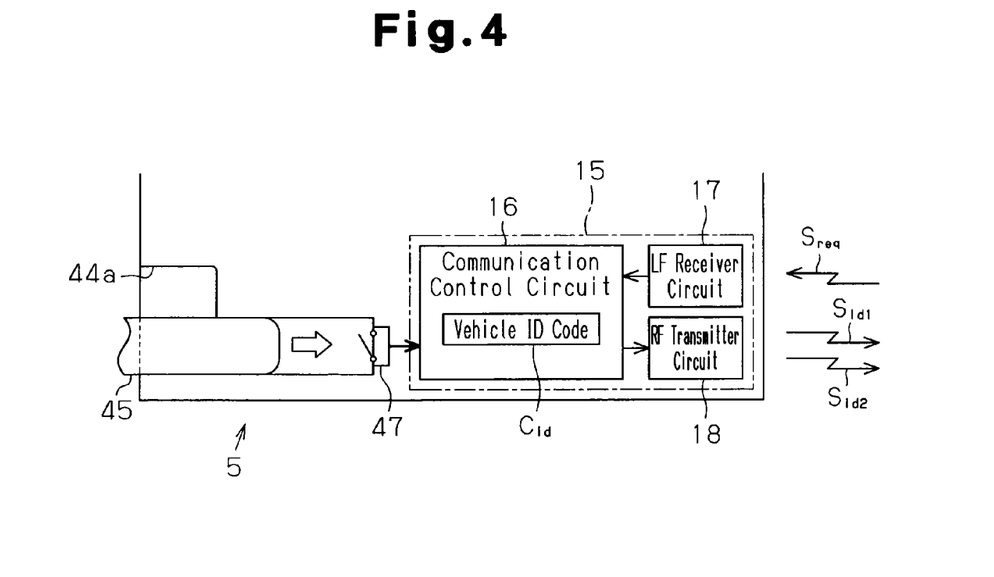
FIG. 4 is a schematic block diagram of the portable device that can retain the emergency key.

As shown in FIG. 4, the portable device main body 44 includes a key retainment detection switch 47, which detects the emergency key 45 when retained in the retaining socket 44a. The key retainment detection switch 47, which is connected to the communication control circuit 16 by an electric wire, generates a switch signal in accordance with whether or not the emergency key 45 is retained in the retaining socket 44a. The key retainment detection switch 47 is arranged on the bottom surface of the retaining socket 44a and activated when the emergency key 45 is completely inserted into the retaining socket 44a. The key retainment detection switch 47 forms the retainment check means (one of the plurality of authentication means).

When sending the vehicle ID signal Sid to the vehicle in response to the request signal Sreq, the communication control circuit 16 notifies the vehicle of the determination result as to whether or not the emergency key 45 is retained in the retaining socket 44a. That is, as long as the emergency key 45 is retained in the retaining socket 44a, the communication control circuit 16 transmits to the vehicle a first response signal Sid1, which includes the vehicle ID code Cid and a key retainment notification, as a signal in the RF band. If the emergency key 45 is not retained in the retaining socket 44a, the communication control circuit 16 transmits to the vehicle a second response signal Sid2, which includes the vehicle ID code Cid and a key non-retainment notification, as a signal in the RF band.

The verification ECU 7 receives the first response signal Sid1 or the second response signal Sid2 through the RF receiver 10 and performs interior verification by comparing the vehicle ID code Cid included in the first response signal Sid1 or second response signal Sid2 with the code registered in the vehicle. Further, the verification ECU 7 checks the retainment determination result of the emergency key 45 that is included in the received signal. When determining that the interior verification is established and the emergency key 45 is retained in the portable device main body 44, the verification ECU 7 recognizes the establishment of two authentications. If the emergency key 45 is not retained in the portable device main body 44 even though interior verification is established, the verification ECU 7 recognizes only the establishment of interior verification.

As mentioned above, when temporarily lending the hybrid vehicle 1 to a person, such as when using parking valet service, the emergency key 45 is removed from the portable device main body 44.

Accordingly, the attendant would enter the hybrid vehicle 1 carrying the portable device 5 without the emergency key 45. In this case, in response to the request signal Sreq transmitted from the vehicle, the portable device 5 transmits the second response signal Sid2, which includes the vehicle ID code Cid and the key non-retainment notification, from the portable device main body 44. Thus, only the first interior verification is established with the vehicle ID code Cid. That is, the verification ECU 7 determines that the emergency key is not retained in the portable device main body 44.

Therefore, in this case, the hybrid ECU 27 allows the vehicle to travel in only the EV mode. Accordingly, the type of travel mode for the hybrid vehicle 1 can also be restricted when lending the vehicle to a third person by performing, as one authentication, checking whether or not the emergency key 45 is retained in the portable device 5.

The travel mode setting device of the first embodiment has the advantages described below.

(1) When the ID authentication with the portable device 5 and the biometric authentication with a fingerprint are both established, the hybrid vehicle 1 can travel in any one of the travel modes without any restrictions to its travel functions. When only either one of the authentications is established, the travel functions are restricted so that the hybrid vehicle 1 can travel in only the EV mode. Accordingly, when temporarily lending the vehicle, such as when using valet parking service, only the ID verification with the portable device 5 is established. Thus, the vehicle would be allowed to travel only in the EV mode, and the vehicle can be driven only until the battery 31 drains. Since the vehicle can be lent to a third person by restricting the travel functions, the security against vehicle theft can be improved. Further, the vehicle can be lent to a third person just by handing over the portable device 5 to the third person. That is, the vehicle owner does not have to perform any special setting tasks to restrict the travel functions of the vehicle. Accordingly, there is no difficulty when lending the vehicle to a third person.

(2) If biometric authentication is performed to authenticate an individual when starting the hybrid vehicle 1, the individual is authenticated during the biometric authentication through a process having a high authentication accuracy in which erroneous authentication establishment seldom occurs. This is highly effective for preventing unauthorized use of the vehicle.

(3) If ID verification, which compares the vehicle ID code Cid between the portable device 5 and the vehicle through wireless communication, is performed to authenticate an individual when starting the hybrid vehicle 1, this verification process would be a widely and generally used process. Thus, component costs would be prevented from increasing when implementing this process.

(4) When an authentication mechanism (second communication unit 46 or key retainment detection switch 47) is included in the emergency key 45 or portable device main body 44 of the portable device 5, the emergency key 45 is removed and kept by the vehicle owner when the vehicle is lent to another person. Thus, there would be no need to worry of the glove compartment or trunk being open without consent by a third person. This is highly effective for preventing valuables from being stolen from the vehicle. Accordingly, when lending the vehicle to a third person, the travel functions can be restricted, and valuables are prevented from being stolen from the vehicle.

Second Embodiment

A travel mode setting device according to a second embodiment of the present invention will now be discussed with reference to FIG. 5. The second embodiment is a further form of the vehicle travel function restriction function. Parts that are the same as the first embodiment will be denoted by the same reference characters and will not be described in detail.

Figure 5:
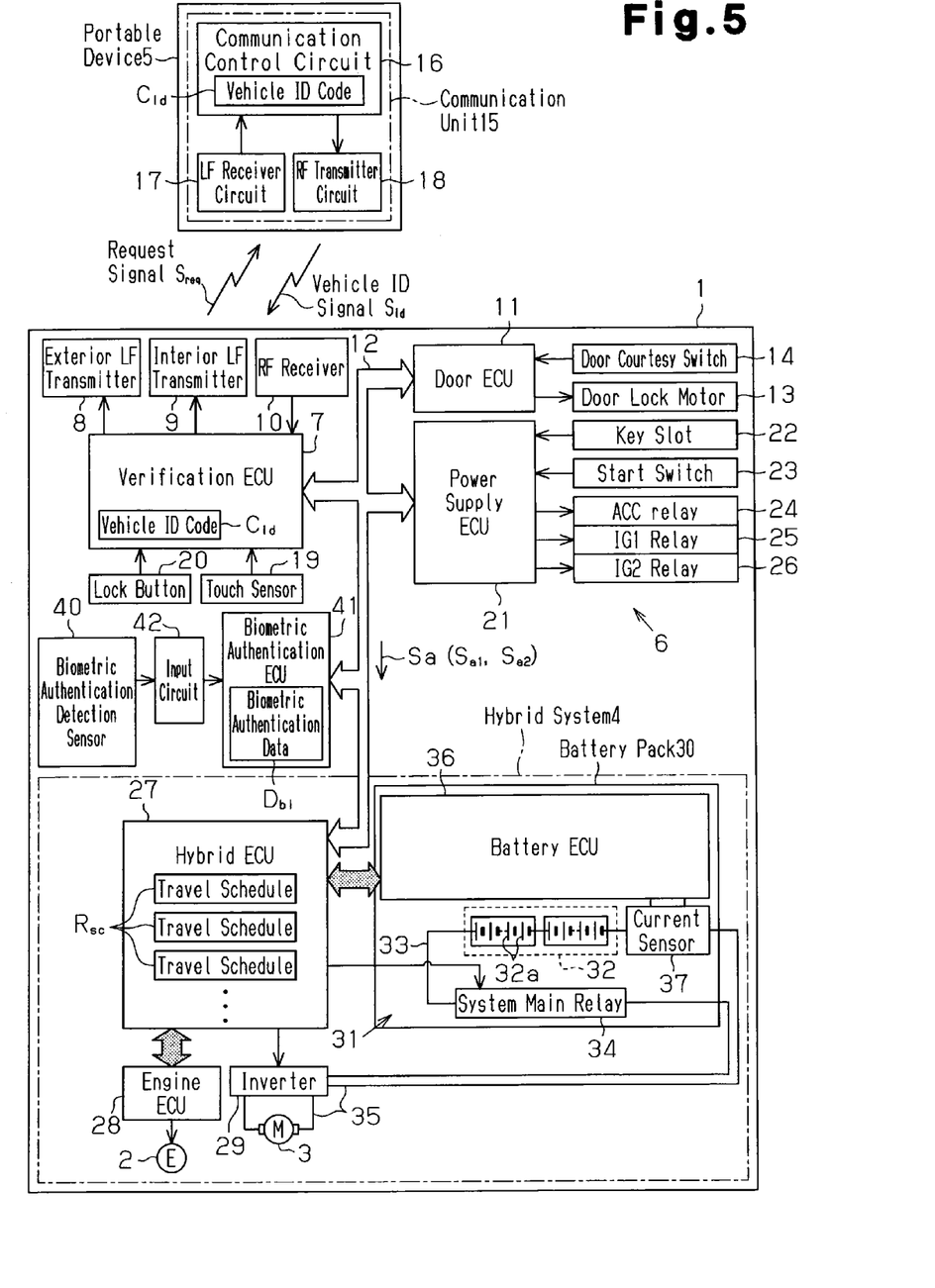
FIG. 5 is a schematic block diagram showing the structure of a hybrid vehicle according to a second embodiment of the present invention.

As shown in FIG. 5, the hybrid ECU 27 includes a memory registering a plurality of travel schedules Rsc, which set how to allow the hybrid vehicle 1 to travel. Each of the travel schedules Rsc is set by the combination of the allowed travel mode and travel time. For example, the travel schedules Rsc may include a schedule that allows traveling for an unlimited time in all four of travel modes (EG mode, first HV mode, second HV mode, and EV mode), a schedule that allows traveling in the four travel modes for only one hour, and a schedule that allows traveling in the four travel modes for only one hour and after the one hour allows traveling in only the EV mode.

Further, when a location detection device using the GPS, such as a car navigation device, is installed in the vehicle, the travel schedules Rsc may include travel range specification. In such a case, examples of the travel schedules Rsc would be a schedule that allows the vehicle to travel within a radius of five kilometers from a reference position, which is the location at which the vehicle is lent, or a schedule in which the vehicle is allowed to travel only within a prefecture. The plurality of travel schedules Rsc may be data-rewritable, for example, by using an exclusive data rewriting device or various types of buttons arranged in the vehicle in a schedule re-writing mode, which implements password authentication When operating the start switch 23 and activating the hybrid system 4, one of the travel schedules Rsc is selected in accordance with the authentication result of the plurality of individual authentication mechanisms, and the hybrid vehicle 1 travels in accordance with the selected travel schedule Rsc. For example, if two individual authentications are both established, the hybrid ECU 27 selects a schedule that allows the vehicle to travel for an unlimited time in any of the travel modes. If only one of the two individual authentications is established, the hybrid ECU 27 selects a schedule that allows traveling in the four travel modes for only one hour within a radius of five kilometers from the location at which the vehicle is lent.

As described above, when temporarily lending the hybrid vehicle to another person such as when using valet parking service, only one of the two individual authentications would be established for the attendant to which the vehicle is lent. In this case, the hybrid ECU 27 selects, for example, the travel schedule Rsc that allows the vehicle to travel for only one hour in the EV mode. In this manner, the hybrid vehicle 1 can be lent to a third person with restrictions imposed on the traveling functions. Thus, the vehicle can be lent to a third person while ensuring security against vehicle theft.

In addition to advantages (1) to (4) of the first embodiment, the travel mode setting device of the second embodiment has the advantages described below.

(5) When lending the hybrid vehicle 1 to a third person, for example, the schedule Rsc that allows the vehicle to travel for only a few hours is selected. Thus, a third person who borrows the vehicle can use the vehicle for only the limited time of a few hours. If the lent vehicle were to be stolen, the vehicle cannot be moved after the time of allowed usage elapses. This increases the probability of the thief leaving the stolen vehicle. For this reason, the recovery possibility of the stolen vehicle is increased. This is very effective for preventing vehicle theft.

Each of the above embodiments may be modified as described below.

In the first and second embodiments, the vehicle ID code Cid registered in the hybrid vehicle 1 or portable device 5 does not necessarily have to be a fixed value. The vehicle ID code Cid may be, for example, rewritable in a code sequence rewriting mode after password authentication is performed. In the same manner, the biometric authentication data Dbi registered in the hybrid vehicle 1 may be rewritable.

In the first and second embodiments, the biometric authentication detection sensor 40 does not necessarily have to be a fingerprint sensor. For example, various types of devices may be used instead such as a vein sensor for detecting a vein rate, an eyeball information sensor for detecting the iris in an eyeball, a voice collection microphone for detecting the voice print of a person, and a camera for detecting the face or movement of a person.

In the first and second embodiments, the biometric authentication detection sensor 40 does not have to be located near the steering wheel 39. For example, the biometric authentication detection sensor 40 may be located in the vehicle on a center cluster, a center console, or any other position.

In the first and second embodiments, the number of authentication mechanisms arranged in the vehicle does not necessarily have to be two and may be three or more. For example, when there are three or more authentication mechanisms, the travel functions are not restricted when authentication is established for each of the authentication mechanisms, and the travel functions are restricted when authentication in any one of the authentication mechanisms is not established.

When setting the travel mode, the combination of the plurality of authentication results is not limited to the combinations of the first and second embodiments. For example, when there are three authentication mechanisms, the travel functions are not restricted when two or more authentications are established, and the travel functions are restricted if only one authentication is established.

In the first and second embodiments, the travel modes registered in the hybrid vehicle 1 is not limited to the four modes, which are the EG mode, the first HV mode, the second HV mode, and the EV mode, and any other travel mode may be registered.

In the first embodiment, the retainment check means for detecting whether or not the emergency key 45 is retained in the portable device main body 44 is not limited to the key retainment detection switch 47, which is of a contact type, and may be, for example, a non-contact type position detection sensor that uses an optical sensor or magnetic sensor.

In the first embodiment, the second communication unit 46 does not have to be arranged in the emergency key 45. For example, the second communication unit 46 may be arranged on a compact detachable piece, which is removably arranged in the portable device main body 44. In this case, when lending the vehicle to a third person, the vehicle owner removes the detachable piece from the portable device main body 44 and hands only the portable device main body 44 to the third person. Further, the key retainment detection switch 47 may be configured to detect the retainment state of the detachable piece.

In the first and second embodiments, the hybrid ECU 27 does not necessarily have to receive the authentication result from the power supply ECU 21. For example, the hybrid ECU 27 may directly receive the authentication result from the verification ECU 7 and the biometric authentication ECU 41.

The invention claimed is:

1. A travel mode setting device for a hybrid vehicle provided with a plurality of travel drive sources and allowed to travel in one of a plurality of travel modes by selectively using the plurality of travel drive sources, the travel mode setting device comprising:
   a plurality of authentication means each for authenticating a vehicle user and generating an authentication result; and
   a specification means for specifying a usable travel mode from the plurality of travel modes in accordance with the authentication results of the plurality of authentication means, wherein:
   the hybrid vehicle has a first identification code; and
   the plurality of authentication means include:
      a first identification code verification means, which has a second identification code, for determining whether or not the first identification code and the second identification code are the same to authenticate the vehicle user; and
      a second identification code verification means, which has a third identification code, for determining whether or not the first identification code and the third identification code are the same to authenticate the vehicle user.

2. A travel mode setting device for a hybrid vehicle provided with a plurality of travel drive sources and allowed to travel in one of a plurality of travel modes by selectively using the plurality of travel drive sources, the travel mode setting device comprising:
   a plurality of authentication means each for authenticating a vehicle user and generating an authentication result;
   a management means for managing a plurality of travel schedules related to the plurality of travel modes; and
   a specification means for specifying traveling of the hybrid vehicle by selectively setting the plurality of travel schedules in accordance with the authentication results of the plurality of authentication means, wherein:
   the hybrid vehicle has a first identification code; and
   the plurality of authentication means include:
      a first identification code verification means, which has a second identification code, for determining whether or not the first identification code and the second identification code are the same to authenticate the vehicle user; and
      a second identification code verification means, which has a third identification code, for determining whether or not the first identification code and the third identification code are the same to authenticate the vehicle user.

3. The travel mode setting device for a hybrid vehicle according to claim 1, wherein:
   the plurality of travel drive sources include an engine and an electric drive source;
   the plurality of travel modes include an electric drive source travel mode, which drives only the electric drive source, and a hybrid travel mode, which drives both of the engine and the electric drive source; and
   the specification means allows for only the electric drive source travel mode when at least one of the authentication results of the plurality of authentication means indicates non-establishment of authentication and allows for both the electric drive source travel mode and the hybrid travel mode when every one of the authentication results of the plurality of authentication means indicates establishment of authentication.

4. The travel mode setting device for a hybrid vehicle according to claim 1, wherein:
   the plurality of authentication means includes a biometric authentication means for obtaining biometric information from the vehicle user and using the biometric information to authenticate the vehicle user.

5. The travel mode setting device for a hybrid vehicle according to claim 1, wherein:
   the hybrid vehicle includes a portable device formed by a vehicle key, which is usable for starting the hybrid vehicle, and a main body in which the vehicle key is removably retained; and
   the plurality of authentication means includes a retainment check means for detecting whether or not the portable device is retained in the main body of the portable device to authenticate the vehicle user.

6. The travel mode setting device for a hybrid vehicle according to claim 1, wherein:
   the specification means controls driving of the plurality of travel drive sources so as to limit travel functions of the hybrid vehicle when less than a predetermined number of the authentication results of the plurality of authentication means indicate establishment of authentication.

7. The travel mode setting device for a hybrid vehicle according to claim 2, wherein:
   the plurality of travel drive sources include an engine and an electric drive source;
   the plurality of travel modes include an electric drive source travel mode, which drives only the electric drive source, and a hybrid travel mode, which drives both of the engine and the electric drive source; and
   the specification means allows for only the electric drive source travel mode when at least one of the authentication results of the plurality of authentication means indicates non-establishment of authentication and allows for both the electric drive source travel mode and the hybrid travel mode when every one of the authentication results of the plurality of authentication means indicates establishment of authentication.

8. The travel mode setting device for a hybrid vehicle according to claim 7, wherein:
the plurality of authentication means includes a biometric authentication means for obtaining biometric information from the vehicle user and using the biometric information to authenticate the vehicle user.

9. The travel mode setting device for a hybrid vehicle according to claim 2, wherein:
the plurality of authentication means includes a biometric authentication means for obtaining biometric information from the vehicle user and using the biometric information to authenticate the vehicle user.

10. The travel mode setting device for a hybrid vehicle according to claim 2, wherein:
the hybrid vehicle includes a portable device formed by a vehicle key, which is usable for starting the hybrid vehicle, and a main body in which the vehicle key is removably retained; and
the plurality of authentication means includes a retainment check means for detecting whether or not the portable device is retained in the main body of the portable device to authenticate the vehicle user.

11. The travel mode setting device for a hybrid vehicle according to claim 10, wherein:
the specification means controls driving of the plurality of travel drive sources so as to limit travel functions of the hybrid vehicle when less than a predetermined number of the authentication results of the plurality of authentication means indicate establishment of authentication.

12. The travel mode setting device for a hybrid vehicle according to claim 2, wherein:
the specification means controls driving of the plurality of travel drive sources so as to limit travel functions of the hybrid vehicle when less than a predetermined number of the authentication results of the plurality of authentication means indicate establishment of authentication.

13. A travel mode setting device for a hybrid vehicle provided with a plurality of travel drive sources and allowed to travel in one of a plurality of travel modes by selectively using the plurality of travel drive sources, the travel mode setting device comprising:
a plurality of authenticators each for authenticating a vehicle user and generating an authentication result; and
a specifier for specifying a usable travel mode from the plurality of travel modes in accordance with the authentication results of the plurality of authenticators, in which the specifier is an electronic control unit, wherein:
the hybrid vehicle has a first identification code; and
the plurality of authenticators include:
a first identification code verification means, which has a second identification code, for determining whether or not the first identification code and the second identification code are the same to authenticate the vehicle user; and
a second identification code verification means, which has a third identification code, for determining whether or not the first identification code and the third identification code are the same to authenticate the vehicle user.

* * * * *